(12) United States Patent
Kraus et al.

(10) Patent No.: US 10,109,440 B2
(45) Date of Patent: Oct. 23, 2018

(54) SAFETY SWITCH

(71) Applicant: Euchner GmbH & Co. KG, Leinfelden-Echterdingen (DE)

(72) Inventors: Matthias Kraus, Ostfildern (DE); Markus Hörtling, Leinfelden-Echterdingen (DE); Monika Schmid, Grossbettlingen (DE); Dominik Schmid, Grossbettlingen (DE); Timo Siefert, Leinfelden-Echterdingen (DE); Jens Rothenburg, Nürtingen (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 227 days.

(21) Appl. No.: 15/222,985

(22) Filed: Jul. 29, 2016

(65) Prior Publication Data

US 2017/0040131 A1 Feb. 9, 2017

(30) Foreign Application Priority Data

Aug. 6, 2015 (DE) .................. 10 2015 112 995

(51) Int. Cl.
*H02H 11/00* (2006.01)
*H01H 47/00* (2006.01)
*G05B 9/03* (2006.01)

(52) U.S. Cl.
CPC ............ *H01H 47/002* (2013.01); *G05B 9/03* (2013.01); *G05B 2219/24008* (2013.01); *G05B 2219/24192* (2013.01)

(58) Field of Classification Search
CPC ............... H01H 47/002; G05B 9/03; G05B 2219/24008; G05B 2219/24192
USPC ........................................ 307/326
See application file for complete search history.

(56) References Cited

U.S. PATENT DOCUMENTS

2007/0090694 A1* 4/2007 Pullmann ............. H01H 47/002
307/112
2016/0178125 A1* 6/2016 Nair ........................ F16P 3/00
307/328

\* cited by examiner

*Primary Examiner* — Carlos Amaya
(74) *Attorney, Agent, or Firm* — Michael Soderman

(57) ABSTRACT

The invention relates to a safety switch (2) with a redundant input structure and with a redundant output structure. The safety switch (2) is designed for integration into a series connection (1) of safety switches (2); the safety switch (2) has devices for detecting and adjusting the operating mode in the series connection (1). The safety switch (2) is designed for replacement in the series connection (1) during its operation.

22 Claims, 6 Drawing Sheets

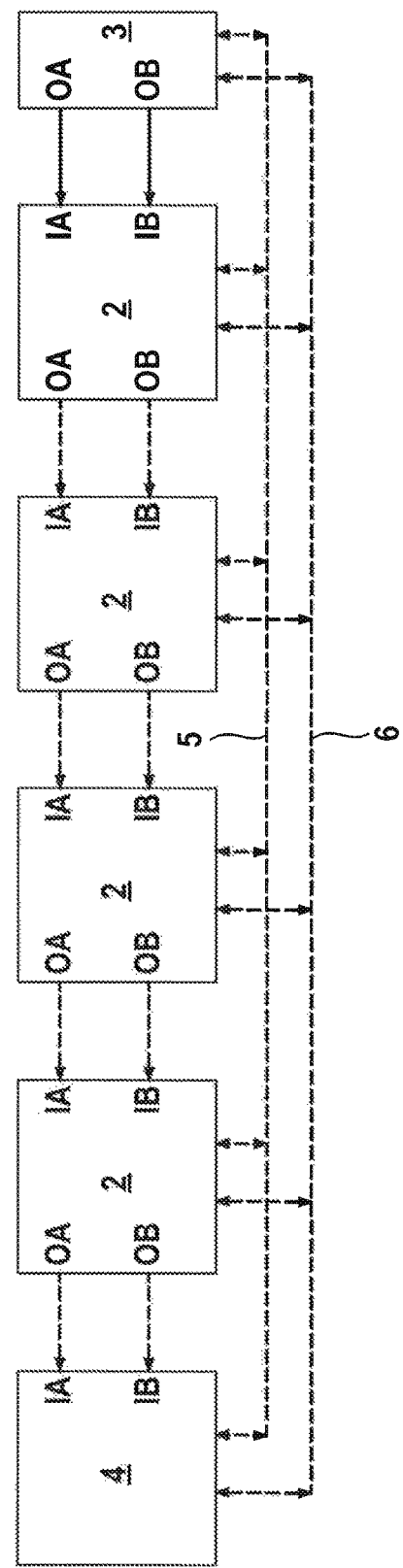

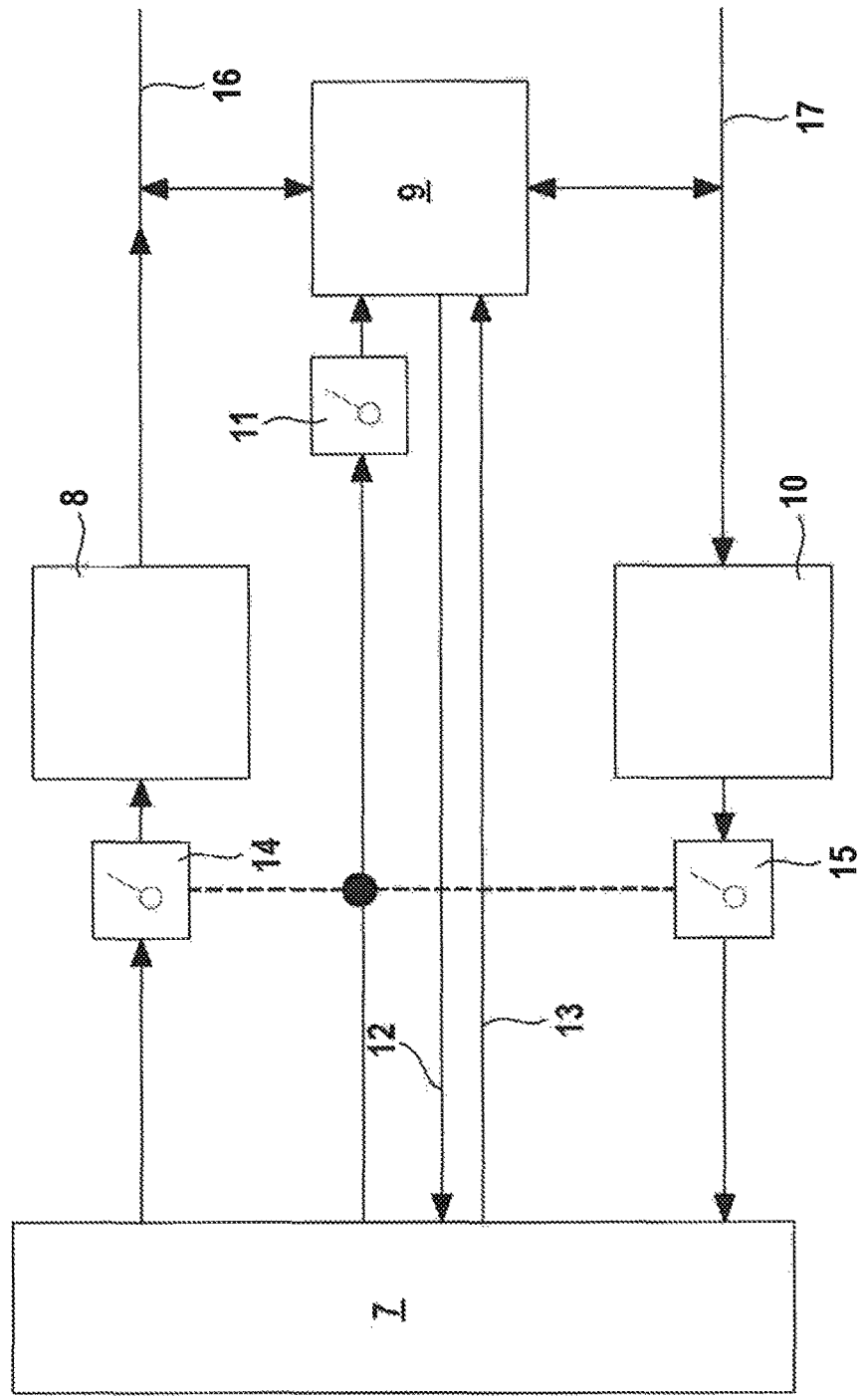

SAFETY SWITCH

CROSS REFERENCE TO RELATED APPLICATIONS

This application claims the priority of DE 102015112995.7 filed on 2015 Aug. 6; this application is incorporated by reference herein in its entirety.

BACKGROUND

The invention relates to a safety switch and a series connection with safety switches.

Safety switches are used in the field of safety engineering; they are especially used to protect dangerous zones of machines and systems.

As an example, safety switches of that type can work with transponders; whether or not a door or the like, as access to a machine or system, is closed can be detected with the aid of the transponder signals.

A safety switch of this type typically has a redundant input structure comprised of two inputs and a redundant output structure with two outputs. The safety switch generates, in accordance with its monitoring function, especially in dependence upon the transponder signal, a switching signal that is output to a control unit via which the machine to be monitored is controlled. If a danger-free situation is detected with the safety switch, in particular that a door to be monitored is closed, a switching signal with the switching state "switched-on status" is generated in accordance with an active safety criterion, meaning a release signal. If the control unit receives this release signal from the safety switch, the control unit can start operation of the machine or leave the machine in operation. If an open door is registered with the safety switch, however, it will generate a switching signal with the switching state "switched-off status" corresponding to a safety criterion that is not active. In that case, the safety switch shuts down the machine to avoid situations that involve danger.

In general, a series connection of safety switches of that type can also be provided, in particular to monitor complex danger zones.

To reliably rule out a situation involving danger with a series connection of that type, its function is such that if a safety switch outputs a switching signal with the switching state "switched-off status", this switching state will be passed through all of the subsequent safety switches up to the control unit, so the control unit will put the machine into the safe, meaning shutdown, state based on this switching signal.

A safety switch of that type that can be used in a series connection is the safety switch of the type CES-AR of the company Euchner GmbH & co. KG. This safety switch will be called a standard safety switch below.

A key feature of this standard safety switch is that it emits test pulses at its outputs and, in fact, both when a switching signal with the switching state "switched-on status" is emitted at the outputs and when a switching signal with the switching state "switched-off status" is emitted. These test pulses are not just used to check the switching capability of the outputs of the respective standard safety switch.

SUMMARY

The invention relates to a safety switch (2) with a redundant input structure and with a redundant output structure. The safety switch (2) is designed for integration into a series connection (1) of safety switches (2); the safety switch (2) has devices for detecting and adjusting the operating mode in the series connection (1). The safety switch (2) is designed for replacement in the series connection (1) during its operation.

DETAILED DESCRIPTION

The invention is based on the problem of providing a safety switch and a series connection with safety switches that have a high level of functionality with low construction expense.

The features of the independent claims are provided to solve this problem. Advantageous embodiments and useful design developments of the invention are described in the dependent claims.

The invention relates to a safety switch with a redundant input structure and with a redundant output structure. The safety switch is designed for integration into a series connection of safety switches; the safety switch has devices for detecting and adjusting the operating mode in the series connection. The safety switch is designed for replacement in the series connection during its operation.

The safety switch as per the invention, which will only be called a safety switch (without the additional qualification) below to differentiate it from the known standard safety switch mentioned at the outset, has substantially increased functionality with respect to this known standard safety switch.

In general, the safety switch can be used in an individual arrangement. Since the safety switch as per this invention can automatically identify operating modes in a series connection and correspondingly adjust them in an automatic way, a possibility for use of the safety switch that is especially flexible is enabled in various series connections.

The fact that a safety switch can be replaced during the operation of a series connection in a series connection of safety switches as per the invention and, in fact, regardless of the switching signal that this safety switch is currently emitting, is especially advantageous.

If a safety switch is removed from the series connection, the next safety switch will no longer receive a voltage signal, which corresponds to the switching state "switched-off status". Since no test pulses are output in this switching state, the next safety switch will also not wait for test pulses, so the removal of the safety switch is not critical.

The switching capability of the redundant output structure is tested with the test pulses in general.

The redundant output structure of two outputs and the redundant input structure of two inputs is formed in an advantageous way; a first output and a first input form a first channel, and a second input and a second output form a second channel. The switching capability of an output is tested by reading the test pulses at this output of a channel back to the other respective channel.

The safety switch as per the invention is designed in an especially advantageous way to output test patterns over the redundant output structure and to received test patterns over the redundant input structure.

In so doing, test patterns are output during a power-up and otherwise only in the switched-on status of the safety switch.

The functionality of the safety switch is substantially expanded with the transmission of test patterns.

In particular, the position of a safety switch in a series connection can be specified, identified and distinguished via test patterns.

The capability of specifying the operating mode of the safety switch via test patterns is also advantageous.

In particular, the test patterns are used for a replacement of a safety switch in a series connection.

If the new safety switch is then added to the series connection, its position is communicated to it by the test patterns of the previous safety switch and it can then generate its test pattern in the series connection for the next safety switch.

Each test pattern is comprised of a sequence of individual pulses in general.

In accordance with an advantageous design form, the safety switch as per the invention has parameterization devices.

A series connection can be realized with the safety switches in accordance with the invention.

In general, the redundant input structure of the first safety switch of the series connection is connected to a strapping plug here. The switching signal of the last safety switch of the series connection is fed into a control unit via its redundant output structure.

In the case that one of the safety switches emits a switching signal with the switching state "switched-off status" through its redundant output structure, this switching state will pass through the subsequent safety switches of the series connection to the control unit.

In accordance with a first variant of the invention, no standard safety switches are provided in the series connection, but instead only safety switches; they transmit short test pulses and test patterns in accordance with their specifications.

In this case, the positions of the individual safety switches in the series connection are known and specified by the test patterns that are generated by the safety switches and fed to the next respective safety switch. In so doing, the safety switches only transmit the test patterns and test pulses when the respective sensor emits a switching signal with the switching state "switched-on status". A safety switch can therefore be replaced during the operation of the series connection; the safety switch that is newly added to this series receives notification of its position in the series from the previous safety switch via the test patterns and it can then communicate with the safety switches in the series.

In accordance with a first alternative, the switching signal of the last safety switch of the series connection is directly fed into the control unit.

In accordance with a second alternative, the switching signal of the last safety switch of the series connection is fed into the control unit via an evaluation device; the outputs of the last safety switch are connected to one input each of the evaluation device for this.

The evaluation device is connected to the safety switches of the series connection via a communication system here.

A further communication channel is consequently provided with the evaluation device that makes an exchange of data possible with the safety switches of the series connection. Data that is not relevant for safety and data that is relevant for safety can be transmitted through this communication channel.

In general, positions are assigned to the safety switches via the evaluation device where the safety switches are subsequently addressed by the evaluation device.

In so doing, the positions can be assigned for the safety switches, on the one hand, via the evaluation device and the communication lines of the communication system. As an alternative, the positions can also be assigned in such a way that the evaluation device transmits position information through its inputs to the outputs of the redundant output structures of the safety switches.

In accordance with a second variant of the invention, at least one standard safety switch exists in the series connection in addition to one or more safety switches; the standard safety switch is distinguished from the safety switch by the fact that it transmits test pulses when the switching signal is in the switching state "switched-on status" and when the switching signal is in the switching state "switched-off status". The standard safety switch cannot be replaced during the operation of the series connection.

In this case, the safety switches as per the invention existing in the series connection are operated in a compatibility mode in which these safety switches behave exactly like standard safety switches. The safety switches automatically adapt their operating mode to the safety switches existing in the series connection here, so a high level of functionality of the series connection is achieved.

The operating mode of the safety switches in the series connection is advantageously specified in an automatic way during a power-up.

The safety switch is adjusted in the compatibility mode type of operation in that it receives test pulses from its predecessor in the series connection in accordance with the specification of a standard safety switch.

In this case, the strapping plug assigned to the first device pre-establishes a voltage level corresponding to a "high" level of the inputs of the standard safety switch, meaning that the strapping plug constitutes a passive element. In the case that a safety switch is provided as a first device in the series connection, an active strapping plug is assigned to it that emits test pulses of a standard safety switch; the safety switches are operated in compatibility mode via the detection of these test pulses.

The operating mode of the safety switches is pre-established in compatibility mode by the strapping plug as an active element in this case.

In a series connection in which there are standard safety switches and in which the safety switches existing in the series connection are therefore operated in compatibility mode, all of the participants of the series will generate test pulses in accordance with the specification of standard safety switches, whose pulse duration is longer than that of a test pulse of a safety switch as per the invention.

When the last participant of the series is a safety switch as per the invention, it can be correspondingly parameterized or configured to nevertheless feed short test pulses in accordance with the specification of safety switches as per the invention to the control unit downstream from the series of safety switches and standard safety switches.

BRIEF DESCRIPTION OF THE DRAWINGS

The invention will be explained with the aid of the drawings below. The following are shown in the figures:

FIG. 1d: Second example of a series connection with a multiple arrangement of safety switches as per the invention with an evaluation device.

FIG. 2a: Schematic diagram of the transmission of test pulses between safety switches of the series connection in accordance with FIG. 1a.

FIG. 2b: Schematic diagram of the transmission of test patterns between safety switches of the series connection in accordance with FIG. 1a.

FIG. 3: Circuit arrangement of a safety switch of the series connection in accordance with FIG. 1d for connection to the evaluation device.

DETAILED DESCRIPTION OF THE PREFERRED EMBODIMENTS

Figure 1A:
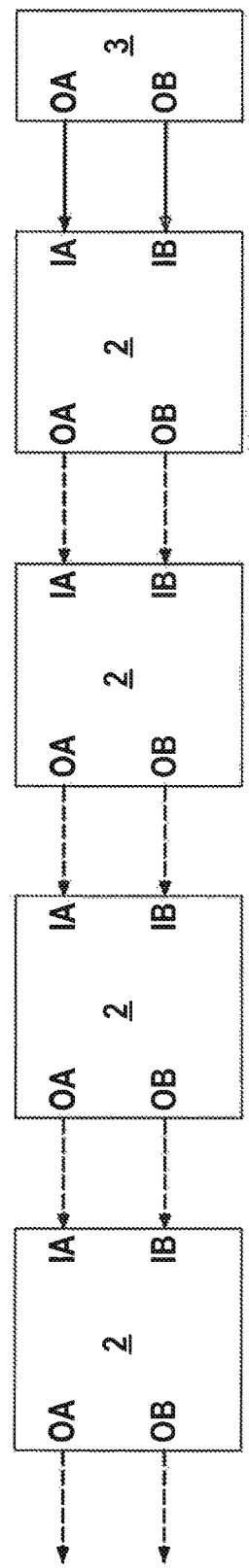
FIG. 1a: A first example of a series connection with a multiple arrangement of safety switches as per the invention.

FIG. 1a shows a first example of a series connection 1 comprised of a multiple arrangement of safety switches 2 as per the invention.

The safety switches 2 with an identical structure are transponder-controlled switches in this case; monitoring can be done with the aid of registered transponder signals, as an example, as to whether a door as access to a danger zone of a machine is closed, meaning locked, or not. Input and output signals are processed in a fail-safe manner in the safety switch 2 for this.

Each safety switch 2 has a redundant output structure in the form of two outputs OA, OB and a redundant input structure in the form of two inputs IA, IB. The safety switch 2 therefore has a two-channel structure with channels A (output OA, input IA) and B (output OB, input IB).

The first safety switch 2 of the series connection 1, on the right-hand side in FIG. 1a, is connected to a strapping plug 3 that constitutes a termination of the series connection 1. The last safety switch 2, on the left-hand side in FIG. 1a, is connected to a control unit, which is not shown. This control unit comprises, as an example, a safety control unit that controls a machine whose danger zone is monitored with the safety switches 2 of the series connection 1.

Each safety switch 2 generates, independently of the registered transponder signals, a switching signal that can be emitted through the outputs OA, OB and that has two switching states. A first switching state is a switched-on status, corresponding to an active safety criterion or a release signal. This switching state is adopted when there is no condition involving danger, for instance when safety switch 2 detects that the monitored door is closed. The second state is a switched-off status corresponding to a non-active safety criterion. This switching state is adopted when there a condition involving danger is detected, for instance when safety switch 2 detects that the monitored door is open.

In the simplest case, the series connection 1 is only comprised of one safety switch 2. The control unit will then only be controlled by the switching signal generated in this safety switch 2.

Four safety switches 2 are provided in the series connection 1 in the series connection 1 of FIG. 1a. In general, a different number of safety switches 2 can also be provided. In particular, more than four safety switches 2 can also form the series connection 1. The series connection 1 then operates to the effect that the first safety switch 2 only generates its switching signal in dependence upon its transponder signals and transmits it to the outputs OA, OB. The other safety switches 2 generate their switching signals in dependence upon the transponder signals and upon the signals extant at the inputs IA, IB. If a safety switch 2 generates a switching signal with the switching state "switched-off status", corresponding to a state involving danger, this switching signal is passed through the subsequent safety switches 2 to the control unit so that the control unit puts the machine into a safe state, meaning shut down. This procedure applies in the same way to all of the subsequent examples of series connections 1.

Figure 2A:
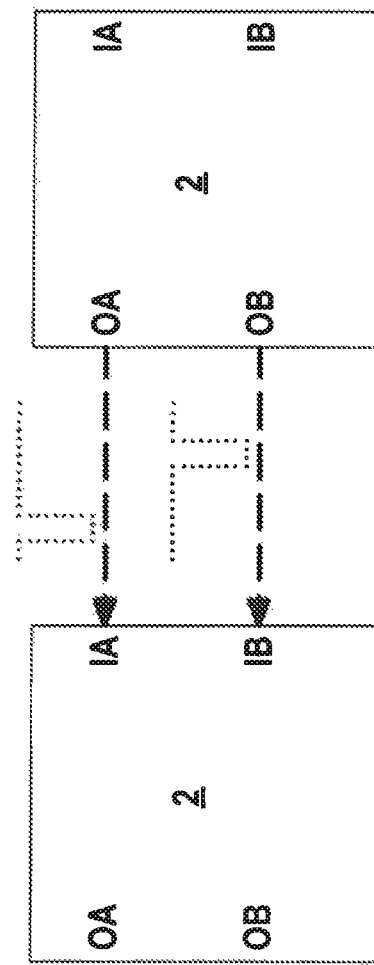

Each safety switch 2 generates test pulses that, as shown in FIG. 2a, are transmitted from one safety switch 2 to the next safety switch 2.

Figure 2B:
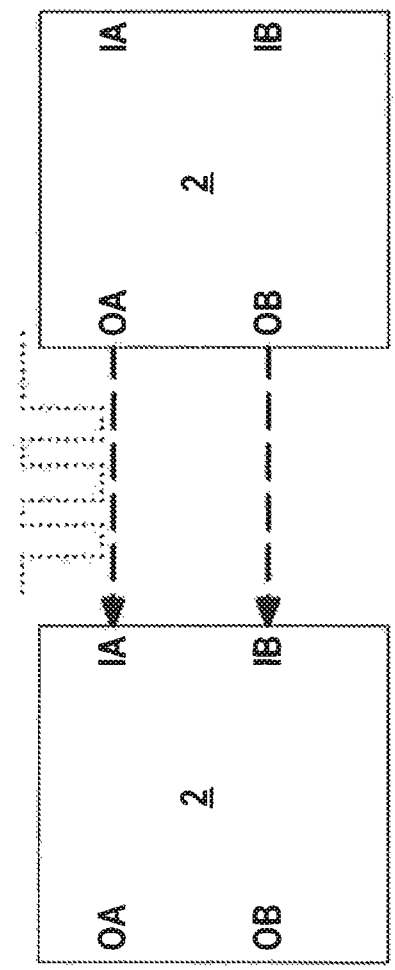

As FIG. 2b shows, each of the safety switches 2 also emits test patterns, meaning pulse sequences comprised of a number of individual pulses. The pulse duration of the individual pulses and the breaks between the individual pulses can be the same or different.

A safety switch 2 can identify the respective operating mode by reading in test patterns, so the safety switch 2 can automatically adjust its operating mode accordingly.

Furthermore, the position of a safety switch 2 in the series connection 1 can be determined with the aid of the test patterns, as described at the outset.

With regard to the safety switches 2 of the series connection 1 in accordance with FIG. 1a, each of the safety switches 2 will only emit test pulses in the switched-on status. It is therefore possible to replace a safety switch 2 during operation of the series connection 1. If a safety switch 2 is removed from the series connection 1, the next safety switch 2 will not get a voltage signal; its outputs OA, OB will go to a switched-off status and the series connection 1 will go into a safe status because of that. Since no test pulses are to be emitted by the safety switches 2 in the switched-off status, the series connection 1 remains functional. If the new safety switch 2 is then added, it waits until it receives the next test pattern from the previous safety switch 2. After that, the safety switch 2 will know its position in the series connection 1 and can consequently take up communication in the series.

FIG. 1d shows an expansion of the embodiment of the series connection 1 in accordance with FIG. 1a. In the series connection 1 of FIG. 1d, the outputs OA, OB of the last safety switch 2 do not lead directly to the control unit, but instead to inputs IA, IB of an evaluation device 4.

Further communication lines 5, 6 of a communication system lead from the evaluation device 4 to the safety switches 2 and to the strapping plug 3.

Each safety switch 2 has the circuit arrangement shown in FIG. 3 for connection to the communication system. This comprises a microcontroller 7, an output driver 8, a driver 9 and a reset circuit 10. The operator can be activated by the microcontroller 7 via a function selector 11. Furthermore, the microcontroller 7 is connected to the driver 9 via lines 12, 13. Further switches 14, 15 are assigned to the output driver 8 and the reset circuit 10. Communication through the communication system can be activated with this circuit arrangement if the evaluation device 4 is connected to the series connection 1. Data that is not relevant for safety, for instance status messages or error codes of the safety switches 2, is transmitted through the communication system. Communication with the communication participants takes place over the message output 16 and the reset input 17 of the circuit arrangement.

The safety switches 2 are addressed at positions in the communication through the communication system. These positions are assigned when the communication system starts up, in particular during the power-up of the series connection 1.

The positions of the safety switches 2 are assigned via the evaluation device 4. The communication lines 5, 6 can be used to assigned the positions in the process, on the one hand. On the other hand, position information can be transmitted through the inputs IA, IB of the evaluation device 4 to the connected safety switches 2.

Alternatively, the positions of the safety switches 2 can be assigned by passing along the test patterns, which the evaluation device 4 then receives so as to be able to address the safety switches.

Figure 1B:
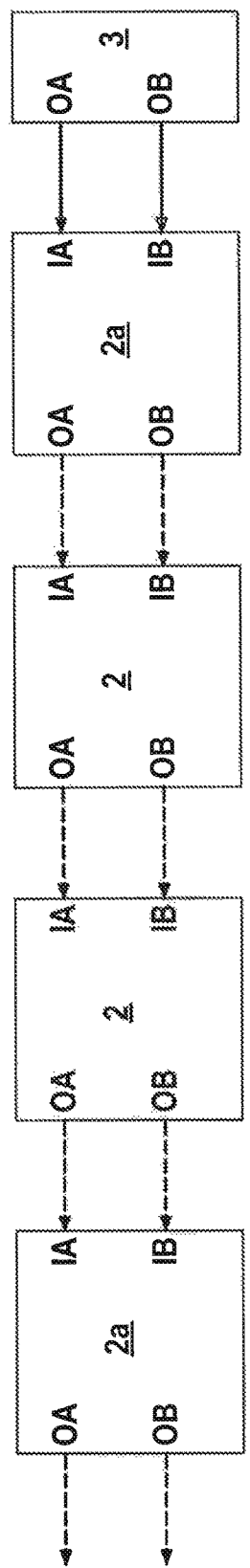
FIG. 1b: First example of a series connection with an arrangement of safety switches and standard safety switches.

FIG. 1b shows an example of a series connection 1 in which standard safety switches 2a are also provided in addition to the safety switches 2 as per the invention.

A standard safety switch 2a is like the safety switch 2 as per the invention, for instance a transponder-controlled switch. The standard safety switch 2a differs from the safety switch 2 as per the invention in that it emits test pulses in every switching state of the safety switch 2.

In the series connection 1 of FIG. 1b, the first and last devices of the series constitute standard safety switches 2a; the other devices comprise safety switches 2.

In this case, the strapping plug 3 pre-establishes a fixed voltage level once again that corresponds to a high level at the outputs IA, IB of the first device. The standard safety switch 2a constituting the first device detects once again that it is the first device in the series. This standard safety switch 2a then transmits test pulses during the power-up to the next device, which is comprised of a safety switch 2. This safety switch 2 detects the test pulses of the standard safety switch 2a and switches to a compatibility mode because of that. The same applies to the subsequent safety switches 2.

In the compatibility mode, all of the safety switches 2 of the series connection 1 behave like standard safety switches 2a, meaning that the safety switches 2 of the series connection 1 emit test pulses like standard safety switches 2a and, in fact, independently of the switching state of the switching signal of the safety switch 2.

Figure 1C:
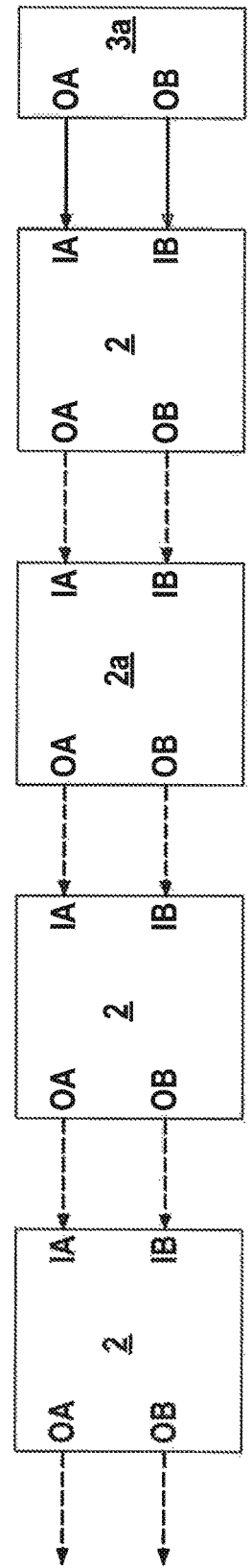
FIG. 1c: Second example of a series connection with an arrangement of safety switches and standard safety switches.

FIG. 1c shows a variant of the series connection 1 in accordance with FIG. 1b. In the series connection 1 in accordance with FIG. 1c, the first, second and fourth devices of the series connection 1 are safety switches 2. The third device is comprised of a standard safety switch 2a.

Since a standard safety switch 2a is arranged in the series connection 1 in accordance with FIG. 1c, the other safety switches 2 of the series connection 1 are operated in the compatibility mode according to the embodiment as per FIG. 1b, meaning that they behave like standard safety switches 2a. Because the first device is not a standard safety switch 2a in the series connection 1 in accordance with FIG. 1c, but instead a safety switch 2, the test pulses of this first device cannot be used to switch the safety switches 2 over to the compatibility mode. That is why an active strapping plug 3a is provided in this case as a termination of the series connection 1. This active strapping plug 3a generates test pulses of a standard safety switch 2a and inputs them into the safety switch 2 constituting the first device so that it (and subsequently all of the other safety switches 2) can change over to the compatibility mode.

LIST OF REFERENCE NUMERALS (1) Series connection
(2) Safety switch
(2a) Standard safety switch
(3) Strapping plug
(3a) Active strapping plug
(4) Evaluation device
(5, 6) Communication line
(7) Microcontroller
(8) Output driver
(9) Driver
(10) Reset circuit
(11) Function selector
(12, 13) Line
(14, 15) Switch
(16) Message output
(17) Reset input
(OA, OB) Output
(IA, IB) Input

The invention claimed is:

1. A safety switch with a redundant input structure and with a redundant output structure, comprising a design configured for integration into a series connection of safety switches, wherein the safety switch has devices for detecting and adjusting the operating mode in the series connection and wherein the safety switch is designed for replacement in the series connection during its operation, wherein the safety switch generates a binary switching signal that is transmitted via the redundant output structure, and wherein the switching signal has, as a first switching state, a switched-on status corresponding to an active safety criterion or a release signal and, as a second switching state, a switched-off status corresponding to a non-active safety criterion, and that test pulses can only be transmitted through the redundant output structure in the switched-on status.

2. The safety switch according to claim 1, wherein the switching capability of the redundant output structure is tested with the test pulses.

3. The safety switch according to claim 2, wherein the redundant output structure comprises two outputs and the redundant input structure comprises two inputs, wherein a first output and a first input form a first channel and a second input and a second output form a second channel, and that the switching capability of one output is tested by reading the test pulses at the output of one of the channels back to the other respective channel.

4. The safety switch according to claim 1, wherein the safety switch is designed to emit test patterns through the redundant output structure and to receive test patterns through the redundant input structure.

5. The safety switch according to claim 4, wherein test patterns are emitted during a power-up and otherwise only in the switched-on status of the safety switch.

6. The safety switch according to claim 4, wherein each test pattern is comprised of a sequence of individual pulses.

7. The safety switch according to claim 4, wherein the operating mode of the safety switch can be preset via test patterns.

8. The safety switch according to claim 4, wherein the position of a safety switch in a series connection can be preset via test patterns.

9. The safety switch according to claim 1, wherein this safety switch has parameterization devices.

10. A series connection with several safety switches, comprising a configuration wherein the redundant output structure of a safety switch is connected to the redundant input structure of the next safety switch, and wherein at least one safety switch in accordance with claim 1 exists in the series connection, and wherein this safety switch has devices for detecting and adjusting the operating mode.

11. The series connection according to claim 10, wherein the redundant input structure of the first safety switch of the series connection is connected to a strapping plug and that the switching signal of the last safety switch of the series connection is fed via its redundant output structure into a control unit.

12. The series connection according to claim 11, wherein in the case that one of the safety switches emits a switching signal with the switching state "switched-off status" through its redundant output structure, this switching state will pass through the subsequent safety switches of the series connection to the control unit.

13. The series connection according to claim 10, wherein at least one standard safety switch exists in this series connection in addition to one or more safety switches, wherein the standard safety switch differs from the safety switch in that it transmits test pulses when the switching signal is in the switching state "switched-on status" and when the switching signal is in the switching state "switched-off status" and wherein the standard safety switch cannot be replaced during the operation of the series connection.

14. The series connection according to claim 13, wherein the safety switch or the safety switches that are arranged with at least one standard safety switch in a series connection are operated in a compatibility mode in which they behave like standard safety switches.

15. The series connection according to claim 10, wherein the operating mode of the safety switches in the series connection is automatically specified during a power-up.

16. The series connection according to claim 13, wherein in the case that a standard safety switch exists as a first device in the series connection, the downstream safety switch or each downstream safety switch will be operated with the aid of test pulses generated by this standard safety switch in compatibility mode.

17. The series connection according to claim 16, wherein the strapping plug assigned to the first device pre-establishes a voltage level corresponding to a "high" level of the inputs of the standard safety switch.

18. The series connection according to claim 13, wherein in the case that a safety switch is provided as the first device in the series connection, it will be assigned an active strapping plug that emits test pulses of a standard safety switch, wherein the safety switches will be operated in compatibility mode by detecting these test pulses.

19. The series connection according to claim 10, wherein no standard safety switches, but instead only safety switches are provided in this series connection, and that a safety switch can be replaced during the operation of the series connection.

20. The series connection according to claim 13, wherein the switching signal of the last safety switch of the series connection is directly fed into the control unit.

21. The series connection according to claim 13, wherein the switching signal of the last safety switch of the series connection is fed via an evaluation device into the control unit, wherein the outputs of the last safety switch are connected to one input each of the evaluation device for this.

22. The series connection according to claim 21, wherein the evaluation device is connected via a communication system to the safety switches of the series connection.

* * * * *